United States Patent
Hamilton et al.

(12)

(10) Patent No.: US 10,588,257 B2
(45) Date of Patent: Mar. 17, 2020

(54) PIVOTING HANDLE ASSEMBLY

(71) Applicant: BLACK & DECKER INC., New Britain, CT (US)

(72) Inventors: Keith Hamilton, Baltimore, MD (US); Justin Barkley, Columbia, MD (US); Tyler Knight, Ellicott City, MD (US); Oleksiy Sergyeyenko, Baldwin, MD (US); David A. Miller, Aberdeen, MD (US)

(73) Assignee: Black & Decker, Inc., New Britain, CT (US)

( * ) Notice: Subject to any disclaimer, the term of this patent is extended or adjusted under 35 U.S.C. 154(b) by 127 days.

(21) Appl. No.: 15/727,233

(22) Filed: Oct. 6, 2017

(65) Prior Publication Data

US 2019/0104679 A1  Apr. 11, 2019

(51) Int. Cl.
| | | |
|---|---|---|
| *A01D 34/82* | (2006.01) | |
| *E01H 5/04* | (2006.01) | |
| *A01D 34/84* | (2006.01) | |
| *A01D 101/00* | (2006.01) | |

(52) U.S. Cl.
CPC .......... *A01D 34/824* (2013.01); *A01D 34/84* (2013.01); *E01H 5/04* (2013.01); *A01D 2101/00* (2013.01)

(58) Field of Classification Search
CPC ...... A01D 34/824; A01D 34/67; A01D 34/84; A01D 34/63; A01D 34/42; A01D 2034/6843; A01D 1/14; A01D 2101/00; E01H 5/04
See application file for complete search history.

(56) References Cited

U.S. PATENT DOCUMENTS

| | | | | |
|---|---|---|---|---|
| 1,389,249 A | * | 8/1921 | Kitchel | ................ A01D 34/62 15/144.1 |
| 2,038,697 A | | 4/1936 | Winslow | |

(Continued)

FOREIGN PATENT DOCUMENTS

| | | |
|---|---|---|
| DE | 202004019453 | 4/2006 |
| DE | 202015106834 U1 | 4/2016 |

(Continued)

OTHER PUBLICATIONS

Extended European Search Report dated Feb. 25, 2019.

*Primary Examiner* — Robert E Pezzuto
*Assistant Examiner* — Adam J Behrens
(74) *Attorney, Agent, or Firm* — John Yun (57) ABSTRACT

According to examples, a machine may include a base housing and a handle assembly mounted to the base housing and extending at an angle from the base housing along a handle plane. The handle assembly may include a mating component having a plurality of slots arranged at multiple angular positions along a slot plane, the slot plane being parallel to the handle plane. The mating assembly may also include a handle segment rotatably mounted to the mating component, the handle segment housing a locking member, in which the handle segment is rotatable along the slot plane relative to the base housing and the locking member is removably insertable into a first slot of the plurality of slots when the handle segment is in a first angular position and is removably inserted into a second slot of the plurality of slots when the handle segment is in a second angular position.

8 Claims, 7 Drawing Sheets

(56) References Cited

U.S. PATENT DOCUMENTS

| | | | | |
|---|---|---|---|---|
| 2,281,639 A * | 5/1942 | Swan | A01D 34/67 | |
| | | | 56/17.2 | |
| 2,487,093 A * | 11/1949 | Bright | A01D 34/58 | |
| | | | 200/302.2 | |
| 3,028,719 A * | 4/1962 | Ivar Jepson | A01D 34/63 | |
| | | | 37/243 | |
| 3,142,950 A | 8/1964 | West | | |
| 3,176,454 A * | 4/1965 | Ivar Jepson | A01D 34/42 | |
| | | | 56/249 | |
| 3,230,695 A * | 1/1966 | West | A01D 34/6806 | |
| | | | 318/762 | |
| 3,430,423 A * | 3/1969 | Lavond | A01D 34/42 | |
| | | | 56/249 | |
| 3,465,505 A | 9/1969 | Krinke | | |
| 3,485,018 A * | 12/1969 | Beckering | A01D 34/71 | |
| | | | 56/13.6 | |
| 3,500,620 A * | 3/1970 | Duran | A01D 34/63 | |
| | | | 174/138 R | |
| 3,679,003 A | 7/1972 | Wadsworth | | |
| 3,747,430 A * | 7/1973 | Miner | A01D 34/62 | |
| | | | 74/523 | |
| 4,244,427 A | 1/1981 | Enters et al. | | |
| 4,392,538 A * | 7/1983 | Goertzen | B62D 51/001 | |
| | | | 16/437 | |
| 4,478,031 A * | 10/1984 | Wolf | A01D 34/82 | |
| | | | 56/202 | |
| 4,738,084 A * | 4/1988 | Ogano | A01D 34/6806 | |
| | | | 16/437 | |
| 4,747,256 A | 5/1988 | Sadakane | | |
| 5,163,275 A * | 11/1992 | Hare | A01D 34/824 | |
| | | | 280/47.36 | |
| 5,203,147 A * | 4/1993 | Long | A01D 34/6818 | |
| | | | 56/10.1 | |
| 6,078,015 A * | 6/2000 | Martinez | A01D 34/6818 | |
| | | | 200/332.2 | |
| 6,557,331 B2 | 5/2003 | Busboom et al. | | |
| 6,698,173 B2 * | 3/2004 | Joseph | A01D 34/001 | |
| | | | 56/11.3 | |
| 7,231,755 B2 | 6/2007 | Clarke | | |
| 7,707,812 B2 | 5/2010 | Cheung | | |
| 8,091,169 B2 | 1/2012 | Jeutter et al. | | |
| 8,544,247 B2 | 10/2013 | Cathcart | | |
| 8,925,293 B2 * | 1/2015 | Mikula | A01D 34/824 | |
| | | | 56/16.7 | |
| 9,078,395 B2 | 7/2015 | Johansson et al. | | |
| 9,491,907 B2 * | 11/2016 | Edholm | A01D 34/824 | |
| 2003/0041578 A1 | 3/2003 | Fuller | | |
| 2005/0097875 A1 | 5/2005 | Haeufele et al. | | |
| 2011/0126502 A1 | 6/2011 | Pitman et al. | | |
| 2012/0047868 A1 * | 3/2012 | Hachisuka | A01D 34/824 | |
| | | | 56/229 | |
| 2013/0046448 A1 | 2/2013 | Fan et al. | | |
| 2013/0152537 A1 | 6/2013 | Cathcart | | |
| 2014/0026530 A1 | 1/2014 | Cathcart | | |
| 2014/0190141 A1 * | 7/2014 | Edholm | A01D 34/824 | |
| | | | 56/10.5 | |
| 2014/0345416 A1 | 11/2014 | Kaskawitz et al. | | |
| 2014/0360740 A1 | 12/2014 | Strange et al. | | |
| 2016/0037719 A1 * | 2/2016 | Bian | A01D 34/824 | |
| | | | 56/10.8 | |

FOREIGN PATENT DOCUMENTS

| | | |
|---|---|---|
| EP | 1791415 B1 | 6/2008 |
| EP | 2476303 | 7/2012 |
| GB | 2366982 A | 3/2002 |

* cited by examiner

PIVOTING HANDLE ASSEMBLY

FIELD

The present disclosure relates to a pivoting handle assembly for a machine, such as a lawn mower, a snow thrower, a snow blower, a tiller, a floor scrubber, or the like. In particular, the present disclosure relates to a handle assembly that may be pivoted to multiple angular positions. In addition, the handle assembly may be moved from one position to another without requiring that an operator remove the operator's hands from the handles of the handle assembly.

BACKGROUND

Machines, such as lawn mowers, are implemented to perform various outdoor operations. These machines are typically walk behind types of machines in which an operator pushes or guides the machine as the machine is moved in a particular direction. Many types of machines are self-propelled, in which a motor drives at least one of the wheels on the machines.

SUMMARY

This section provides a general summary of the disclosure, and is not a comprehensive disclosure of its full scope or all of its features.

According to embodiments disclosed herein, a machine may include a base housing and a handle assembly mounted to the base housing and extending at an angle from the base housing along a handle plane. The handle assembly may include a mating component having a plurality of slots arranged at multiple angular positions along a slot plane, the slot plane being parallel to the handle plane. The handle assembly may also include handle segment rotatably mounted to the mating component, the handle segment housing a locking member, in which the handle segment is pivotable along the slot plane relative to the base housing and wherein the locking member is removably insertable into a first slot of the plurality of slots when the handle segment is in a first angular position and is removably inserted into a second slot of the plurality of slots when the handle segment is in a second angular position.

According to embodiments disclosed herein, a handle assembly may include an intermediate handle segment, a mating component mounted to the intermediate handle segment, the mating component having a plurality of slots arranged at multiple angular positions along a slot plane, a handle segment pivotally mounted to the mating component, the handle segment extending along a handle plane, wherein the handle plane is parallel to the slot plane, and a locking mechanism. The locking mechanism may include a locking member to be inserted into a slot of the plurality of slots, a locking member actuation device, and a locking member attachment device connected to the locking member actuation member and the locking member, in which actuation of the locking member actuation device withdraws the locking member from a slot of the plurality of slots in which the locking member is inserted.

According to embodiments disclosed herein, a lawn mower may include a mower deck, a plurality of wheels rotatably mounted to the mower deck, and a handle assembly mounted to the mower deck and extending at an angle from the mower deck along a handle plane. The handle assembly may include a mating component having a plurality of slots arranged at multiple angular positions along a slot plane, the slot plane being parallel to the handle plane. The handle assembly may also include a handle segment rotatably mounted to the mating component, the handle segment housing a locking member, in which the handle segment is pivotable along the slot plane relative to the mower deck and in which the locking member is removably insertable into a first slot of the plurality of slots when the handle segment is in a first angular position and is removably inserted into a second slot of the plurality of slots when the handle segment is in a second angular position.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are handle assemblies that may be rotated, or equivalently pivoted, to multiple angles with respect to a base housing of a machine. Also disclosed herein are machines that include the handle assemblies. Generally speaking, the handle assemblies disclosed herein may include an intermediate handle portion mounted to the base housing and a handle segment that is rotatably or pivotally mounted to the intermediate handle portion. The handle assemblies may also house a locking mechanism that includes a locking member that may be released from a slot through actuation of a locking member actuation device that may be provided on a handle of a handle assembly. After the locking member is released from the slot, the handle segment may be free to rotate with respect to the intermediate handle portion and upon rotating the handle segment to a desired angle, the locking member may be inserted into another slot to maintain the handle segment in the newly rotated position.

Through implementation of the pivoting handle assembly disclosed herein, the handle of a machine may be moved to different positions to, for instance, adjust where an operator may stand with respect to the machine during use of the machine. In one regard, by varying the position where an operator stands with respect to the machine, the operator may more easily navigate around obstacles. For instance, an operator may position the machine next to an obstacle, such as a fence, a tree, or the like, without having to rub against the barrier. In addition, an operator may vary the position of the handle assembly while the machine is turned on and during use. For instance, an operator may vary the position of the handle assembly on the fly, e.g., without having to stop operation of the machine. That is, an operator may vary the position of the handle assembly without releasing the operator's grip on the handles of the handle assembly.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1:
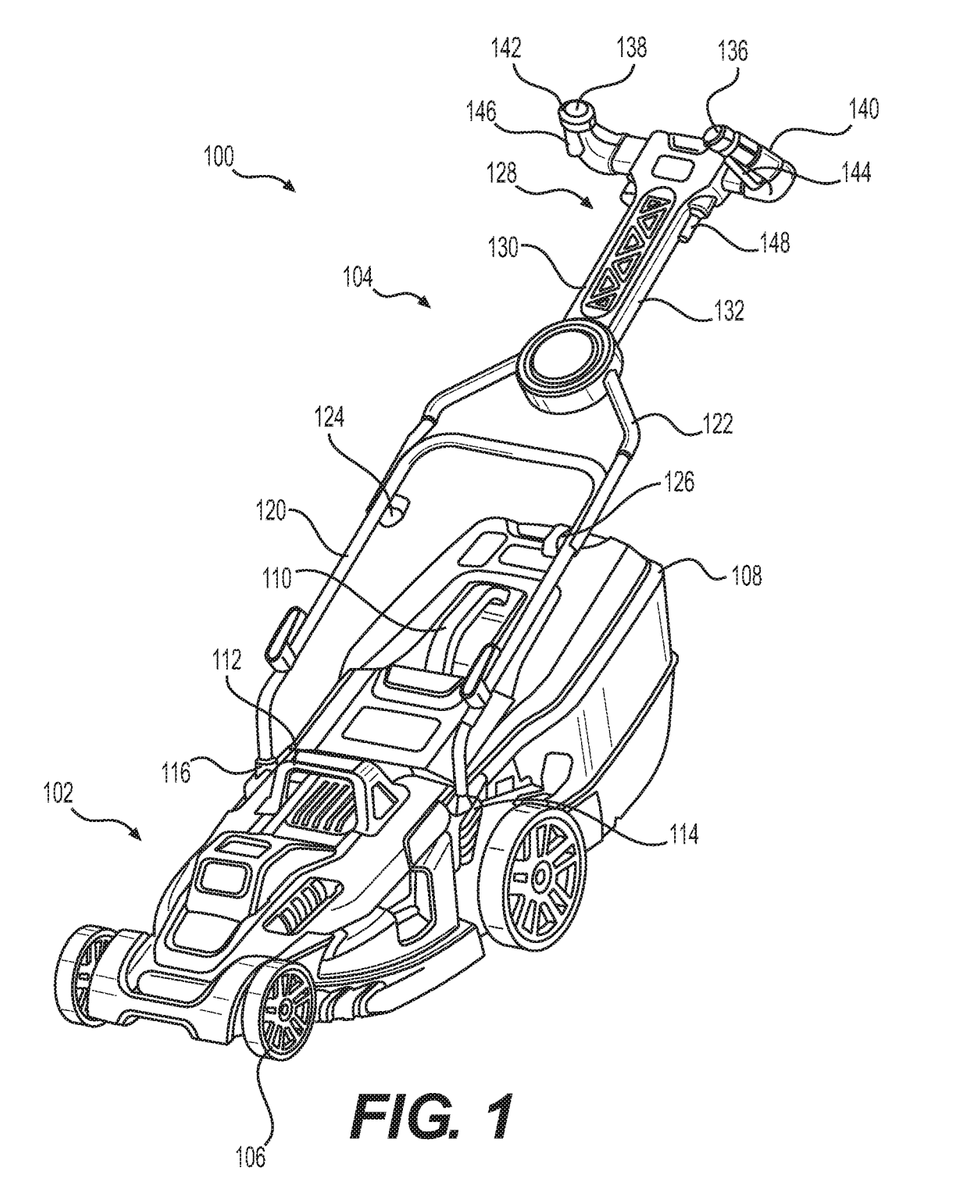
FIG. 1 shows a perspective view of a machine according to an embodiment of the present disclosure.

With reference first to FIG. 1, there is shown a perspective view of a machine 100 according to an embodiment of the present disclosure. It should be understood that the machine 100 depicted in FIG. 1 may include additional components and that some of the components described herein may be removed and/or modified without departing from a scope of the machine 100 disclosed herein. For instance, although the machine 100 is depicted in FIG. 1 as being a lawn mower, it should be understood that the machine 100 may be other types of machines, such as snow throwers, snow blowers, tillers, floor scrubbers, or the like.

As shown in FIG. 1, the machine 100 includes a base housing 102 and a handle assembly 104. The base housing 102 may also be equivalently be termed a mower deck. Although not shown, the base housing 102 may house a motor, a transmission, working implements (such as a cutting tool), and the like. In addition, the base housing 102 includes a set of wheels 106 upon which the machine 100 may be supported. The wheels 106 may be freely rotating or at least one of the wheels 106 may be driven by a motor such that the machine 100 may be self-propelled. The base housing 102 may also include a receptacle 108 mounted to the base housing 102. The receptacle 108 may be removably mounted to the base housing 102 and may collect debris thrown by a working implement housed in the housing 102. For instance, the receptacle 108 may collect grass clippings as the machine 100 is implemented to cut grass. The receptacle 108 may also include a bin handle 110 that an operator may grasp to, for instance, detach the receptacle 108 from the base housing 102, carry the receptacle 108, and to attach the receptacle 108 to the base housing 102. Similarly, the base housing 102 may include a base housing handle 112 that an operator may grasp to, for instance, carry the base housing 102.

The handle assembly 104 may be mounted to the base housing 102 at mounting locations 114, 116 such that the handle assembly 104 extends at an angle with respect to the base housing 102. For instance, the handle assembly 104 may be considered as extending along a handle plane, which may be defined as a plane that extends across a major surface of the handle assembly 104. In some examples, the handle assembly 104 may be fixedly mounted to the base housing 102 at the mounting locations 114, 116 such that the angle between the handle assembly 104 and the base housing 102 remains fixed. In other examples, the handle assembly 104 may be movably mounted to the base housing 102 at the mounting locations 114, 116 such that the angle between the handle assembly 104 and the base housing 102 may be varied. The angle may be varied, for instance, to collapse the handle assembly 104 and thus reduce the space of occupied by the machine 100 as may be useful when storing the machine 100.

As shown, the handle assembly 104 may include a handle base 120 that is mounted to the base housing 102 at the mounting locations 114, 116. The handle base 120 may be a substantially U-shaped component having arms that may removably be mounted to the base housing 102 at the mounting locations 114, 116, for instance, via mechanical fasteners. The handle assembly 104 may also include an intermediate handle portion 122 that may be connected to the handle base 120 via fasteners 124, 126 and a handle segment 128 that may be mounted to the intermediate handle portion 122. The fasteners 124, 126 may include respective knobs to facilitate turning of the fasteners 124, 126 to tighten or loosen the fasteners 124, 126. The handle segment 128 may be composed of a first component 130 and a second component 132, in which the second component 132 may be attached to the first component 130, for instance, through mechanical fasteners, such as screws, through frictionally mating elements, or the like.

Figure 2:
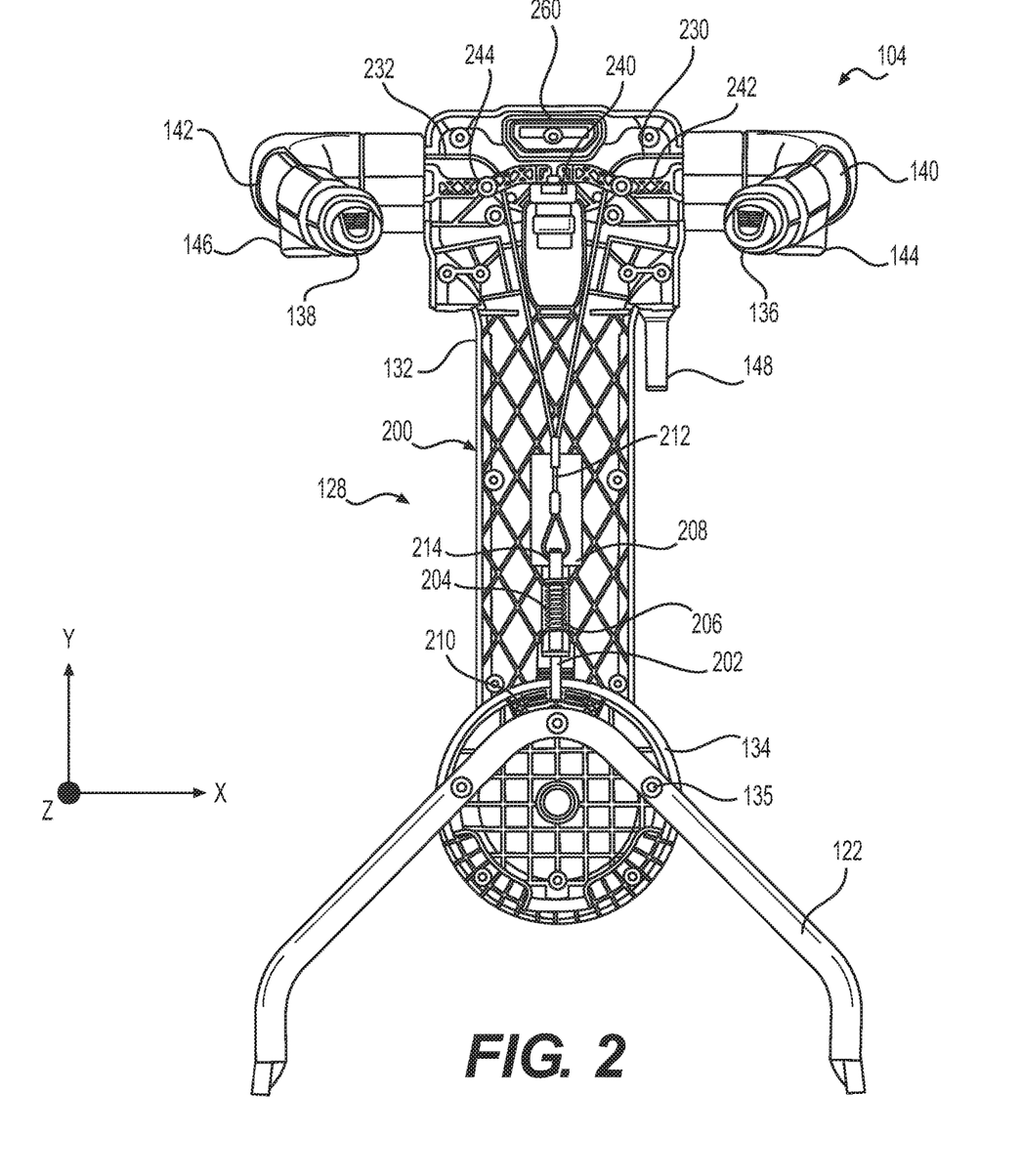
FIG. 2 shows a front view of a portion of the handle assembly depicted in FIG. 1 according to an embodiment of the present disclosure.

Reference is now made to FIGS. 1 and 2. FIG. 2 shows a front view of a portion of the handle assembly 104 depicted in FIG. 1 with the first component 130 of the handle segment 128 removed such that an interior of the handle segment 128 is visible. Also shown is an X, Y, Z coordinate system to facilitate the description of the features shown in FIG. 2. It should be understood that the coordinate system shown in FIG. 2 is for purposes of illustration and should not be construed as limiting the handle assembly 104 to any particular coordinate system.

As shown in FIG. 2, the second component 132 may be rotatably mounted to a mating component 134 that is mounted to the intermediate handle portion 122 via fasteners 135. As also shown, the second component 132 (as well as the first component 130) may include an interior space 200 in which a locking member 202 may be movable in the Y-direction. That is, for instance, the locking member 202 may be held in a pocket 204 of the interior space 200 that may substantially restrict movement of the locking member 202 in the X-direction and the Z-direction, while enabling the locking member 202 to be movable in Y-direction. In addition, a spring 206 may be provided in the interior space 200 and may abut a surface 208 of the pocket 204 to bias the locking member 202 downward along the Y-direction toward the curved member 130. The locking member 202 may be shaped, for instance, as an elongated pin and may be formed of metal, plastic, or the like.

As also shown in FIG. 2, the mating component 134 may include a plurality of slots 210 arranged at multiple angular positions along a slot plane that is parallel to the X-Y plane. As such, the slots 210 are aligned along the same plane as the handle plane in which the handle assembly 204 extends and are at different angles with respect to each other. The slots 210 may be formed along a periphery of the mating component 134 and the locking member 202 may removably be inserted into one of the slots 210 at a time. As shown in FIG. 2, the locking member 202 is inserted into a central slot 210 and thus, the handle segment 128 may extend at a first angle with respect to the intermediate handle portion 122.

Figure 3A:
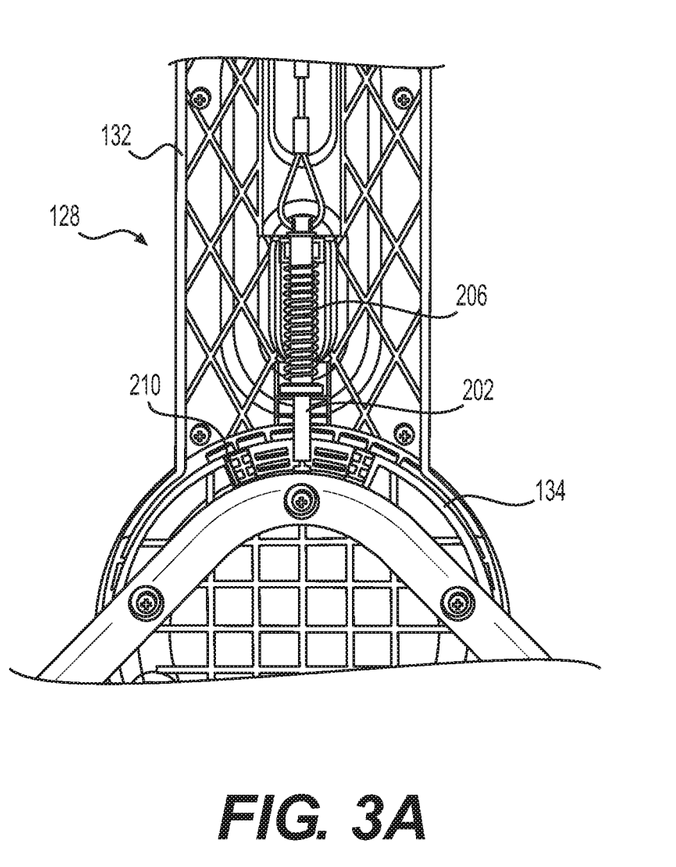
FIGS. 3A and 3B, respectively, depict enlarged views of the mating component and the locking member depicted in FIG. 2.
Figure 3B:
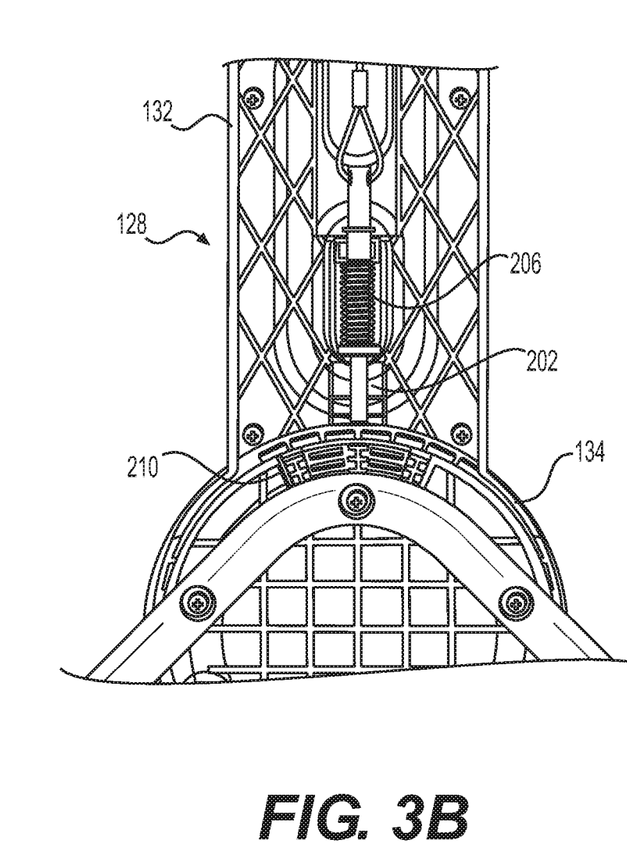

Reference is now made to FIGS. 2, 3A, and 3B. FIGS. 3A and 3B depict enlarged views of the mating component 134 and the locking member 202. As shown in FIGS. 2 and 3A, the locking member 202 may be inserted into the central slot 210. In addition, the spring 206 may be in an expanded state, which may be a normal state of the spring 206. As such, the spring 206 may force and maintain the locking member 202 in an inserted position in the centrally located slot 210. As shown in FIG. 3B, the locking member 202 may be removed from the slot 210 through application of force to compress the spring 206. Force to compress the spring 206 may be delivered as discussed in detail elsewhere herein. Once the locking member 202 is removed from the slot 210, the handle segment 128 may be rotated (or equivalently, pivoted) with respect to the mating component 134. That is, a portion of the handle segment 128 that is rotatably mounted to the mating component 134 may rotate on or with respect to the mating component 134. In addition, following rotation of the handle segment 128 to a desired position, the locking member 202 may be inserted into another one of the slots 210 corresponding to the new position.

Figure 4A:
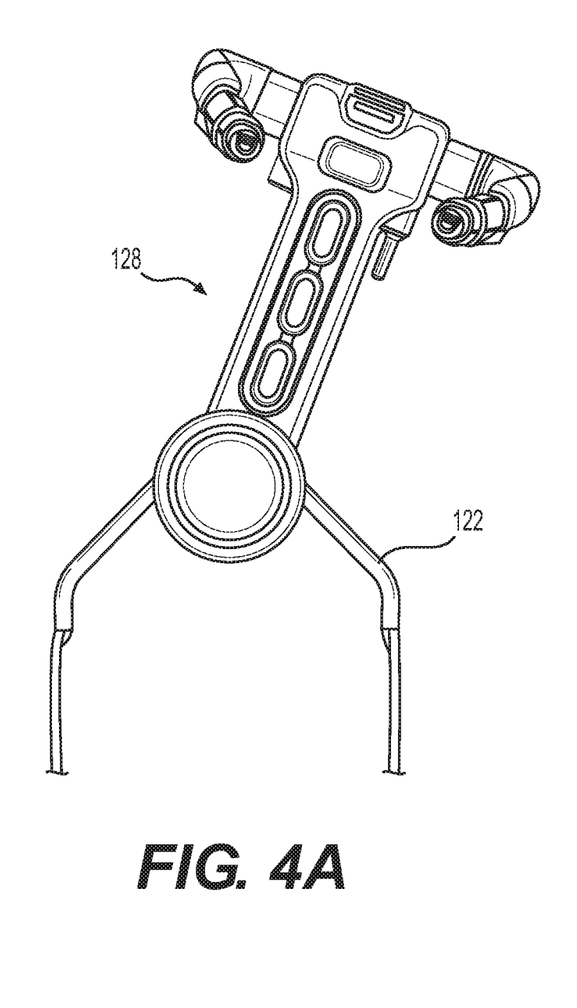
FIGS. 4A and 4B, respectively, depict diagrams of the handle segment depicted in FIGS. 1 and 2 according to an embodiment of the present disclosure.
Figure 4B:
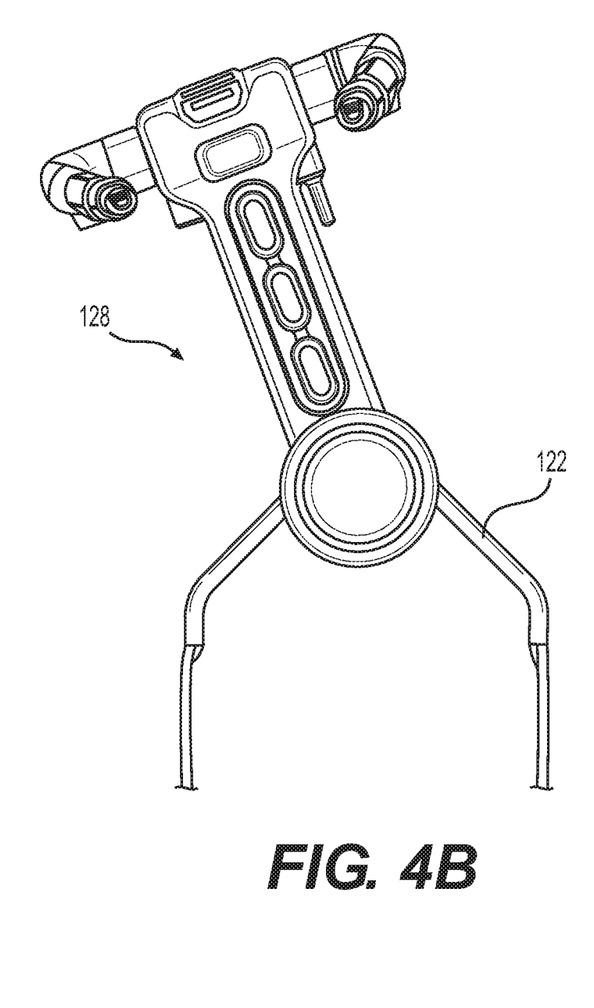

Examples of the handle segment 128 in two different rotated positions with respect to the intermediate handle portion 122 are shown in FIGS. 4A and 4B. In FIG. 4A, the locking member 202 may be inserted into the right-most slot 210 of the mating component 134 and in FIG. 4B, the locking member 202 may be inserted into the left-most slot 210 of the mating component 134. In one regard, the handle segment 128 may be rotated and held in the rotated position with respect to the intermediate handle portion 122 through insertion of the locking member 202 into different ones of the slots 210. Although three slots 210 are depicted in FIGS. 2, 3A, and 3B as being provided in the mating component 134, it should be understood that the mating component 134 may include any number of slots 210 to thus enable the handle segment 128 to be positioned and held at, a fewer or a larger number of positions than as shown in FIGS. 2, 4A, and 4B.

With reference back to FIGS. 1 and 2, a locking member attachment device 212 may be connected to the locking member 202. As shown, the locking member attachment device 212 may include a cable, wire, string, or the like, and the locking member 202 may include an opening 214 through which the locking member attachment device 212 may be inserted. By way of particular example, the locking member attachment device 212 may include a cable formed of a metal, such as steel. The locking member attachment device 212 may also extend through the handle segment 128 and to a first locking member actuation device 136 and a second locking member actuation device 138. In the example shown in FIGS. 1 and 2, the first locking member actuation device 136 and the second locking member actuation device 138 are depressible devices provided on distal ends of the first and second handles 140 and 142.

That is, the handle segment 128 may include a first handle 140 and a second handle 142 located distally from the intermediate handle portion 122 and extending at an angle that is perpendicular to or nearly perpendicular to an angle at which the handle segment 128 extends. For instance, the first handle 140 and the second handle 142 may extend from the handle segment 128 in manners that may be similar to handles extending from a bicycle frame. An operator may maneuver the machine 100 by grasping and applying force onto the first handle 140 and the second handle 142. In addition, in a first example, an operator may release the locking member 202 from a slot 210 through depression of one of the first locking member actuation device 136 or the second locking member actuation device 138. In a second example, an operator may release the locking member 202 from a slot 210 through depression of both of the first locking member actuation device 136 and the second locking member actuation device 138. As used herein, the locking member 202, the spring 206, the locking member attachment device 212, and the first and second locking member actuation devices 136, 138 may together be termed a locking mechanism of the handle assembly 104.

Figure 5A:
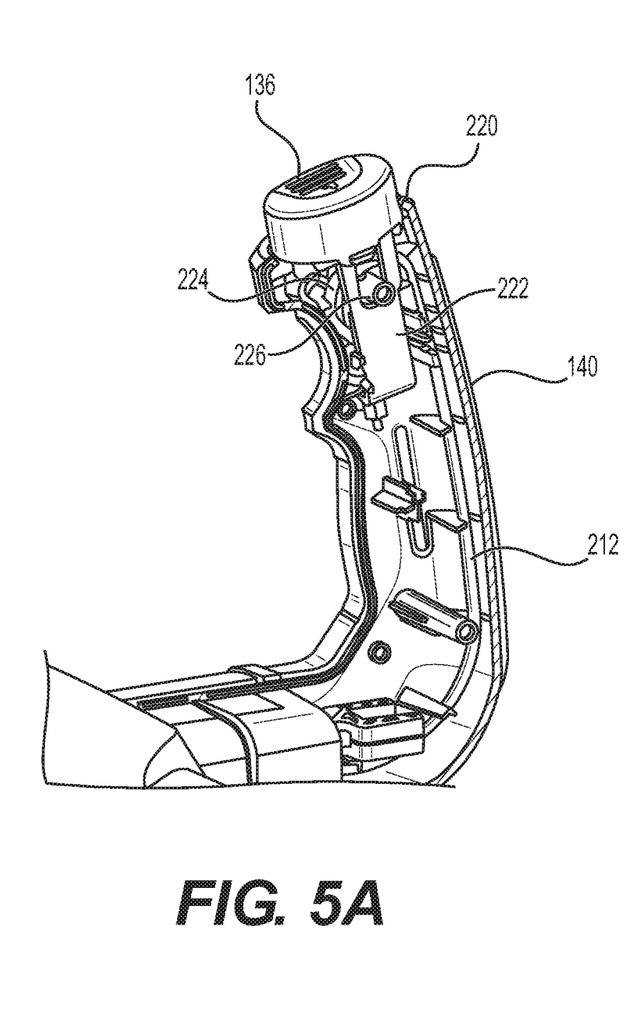
FIGS. 5A and 5B, respectively, depict enlarged views of an interior of the first handle depicted in FIGS. 1 and 2 according to an embodiment of the present disclosure.
Figure 5B:
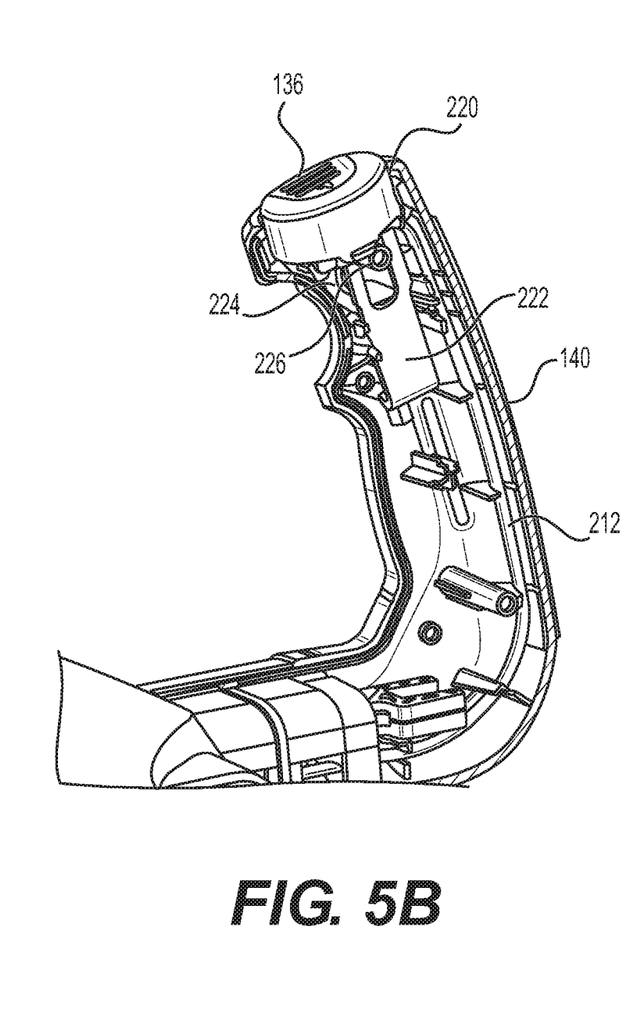

Turning now to FIGS. 5A and 5B, there are shown enlarged views of an interior of the first handle 140 according to an embodiment of the present disclosure. As shown, the first handle 140 may include an opening 220 into which the first locking member actuation device 136 may movably be supported. In addition, the first locking member actuation device 136 may be connected to a support 222 that may move with the first locking member actuation device 136. Moreover, a portion of the locking member attachment device 212 may be attached to the support 222 such that the locking member attachment device 212 also moves with the first locking member actuation device 136. In particular, the locking member attachment device 212 may be formed of a relatively pliable or flexible material and a portion 224 of the locking member attachment device 212 adjacent to the portion that is attached to the support 222 may be curved around an axle structure 226.

In operation, when the first locking member actuation device 136 is depressed as shown in FIG. 5B, the portion 224 of the locking member attachment device 212 may be pulled downward, which may cause the remaining portion of the locking member attachment device 212 to be pulled toward the first locking member actuation device 136. In this regard, the locking member attachment device 212 may be supported in the handle segment 128 to be movable. In addition, as the first locking member actuation device 136 is attached to the locking member 202, movement of the first locking member actuation device 136 causes the locking member 202 to also be pulled away from the intermediate handle portion 122 as shown in FIG. 3B. Once the locking member 202 has been removed from a slot 210, the handle segment 128 may be rotated as shown in FIGS. 4A and 4B.

Although not explicitly shown in FIG. 5A, a spring may bias the first locking member actuation device 136 into the position shown in that figure. As such, following rotation of the handle segment 128, the first locking member actuation device 136 may be released, which may cause the first locking member actuation device 136 to return to the position shown in FIG. 5A. In addition, the spring 206 may pull the locking member attachment device 212 away from the first locking member actuation device 136 and may push the locking member 202 into another one of the slots 210 corresponding to the angle at which the handle segment 128 has been rotated. In some examples, the first locking member actuation device 136 may not be attached to a separate spring and instead, application of force by the spring 206 may be sufficient to bias the first locking member actuation device 136 back to a normal position, e.g., the position shown in FIG. 5A.

As shown in FIG. 2, the locking member attachment device 212 may be split such that a first section 230 of the locking member attachment device 212 is attached to the first locking member actuation device 136 and that a second section 232 of the locking member attachment device 212 is attached to the second locking member actuation device 138 in the second handle 142. The second section 232 may be attached to the second locking member actuation device 138 in a similar or the same manner as shown in FIG. 5A with respect to the first locking member actuation device 138. As discussed herein, in some examples, both the first and the second locking member actuation devices 136, 138 are depressed to release the locking member 202 from a slot 210. And, in other examples, one of the first or the second locking member actuation devices 136, 138 is depressed to release the locking member 202 from a slot 210. The locking member attachment device 212 may be a single device, e.g., cable, or may include a plurality of devices, e.g., cables, that may be connected to each device via attachment mechanisms.

Reference is now made to FIGS. 1, 2, and 6A-6D. FIGS. 6A-6D, respectively, depict perspective views of an interior of an upper portion of the handle segment 128, according to an embodiment of the present disclosure. Particularly, FIGS.

6A-6D depict two stages of operation of a power switch 240 through manipulation of a first trigger 144 and a second trigger 146. As shown in FIGS. 1, 2, 6A, and 6B, the first trigger 144 may be provided at a trigger location on the first handle 140 and the second trigger 146 may be provided at a trigger location on the second handle 142. That is, the first trigger 144 and the second trigger 146 may respectively be provided at locations on the first handle 140 and the second handle 142 at which an operator may depress the first trigger 144 and the second trigger 146 as the operator grips the first handle 140 and the second handle 142. In one regard, the placements of the first and the second locking member actuation devices 136, 138 and the first and the second triggers 144, 146 may enable an operator to simultaneously depress the actuation devices 136, 138 and the triggers 144, 146 without having to release either of the first or the second handles 140, 142. As such, an operator may vary the rotational position of the handle segment 128 while the machine 100 continues to operate.

As also shown in FIGS. 6A-6D, the first trigger 144 may be connected to a first arm 242 and the second trigger 146 may be connected to a second arm 244. In this regard, when the first trigger 144 is depressed, the first arm 242 may be manipulated and when the second trigger 146 is depressed, and the second arm 244 may be manipulated.

Figure 6A:
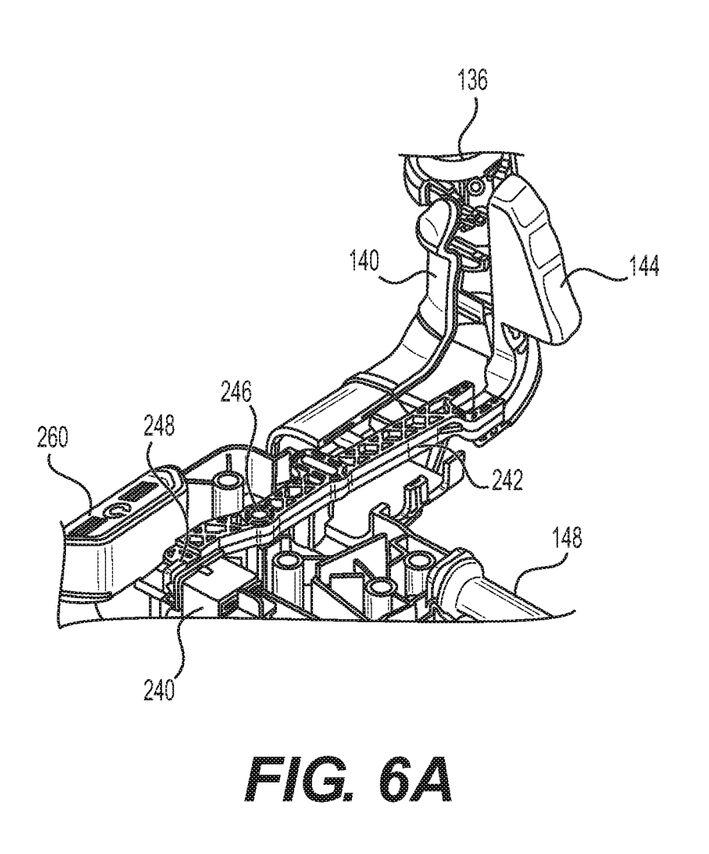
FIGS. 6A-6D, respectively, depict perspective views of an interior of an upper portion of the handle segment depicted in FIGS. 1 and 2, according to an embodiment of the present disclosure.
Figure 6B:
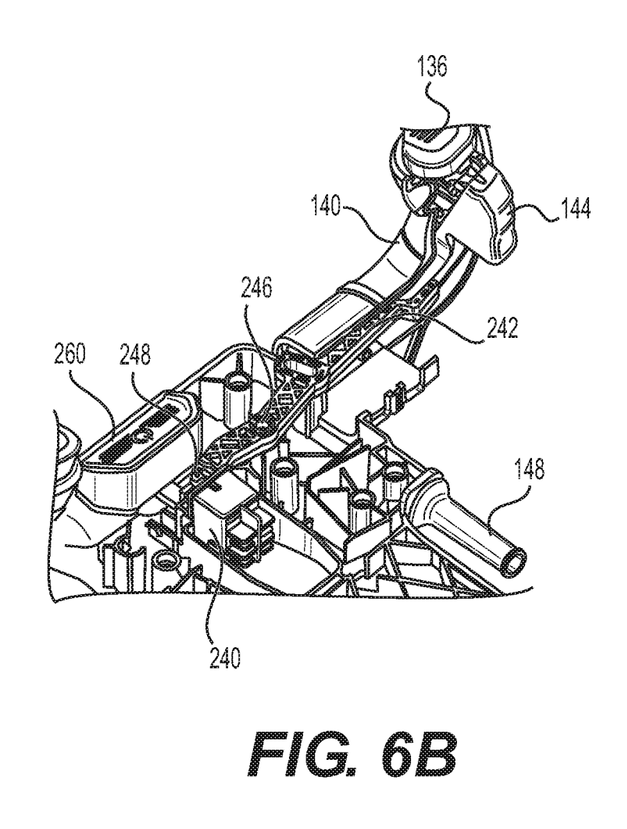
Figure 6C:
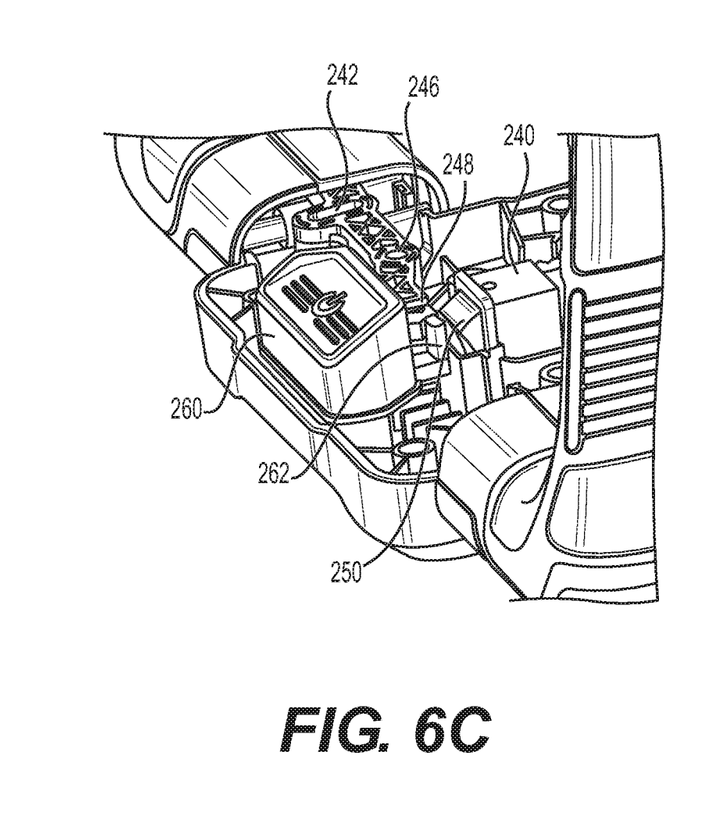
Figure 6D:
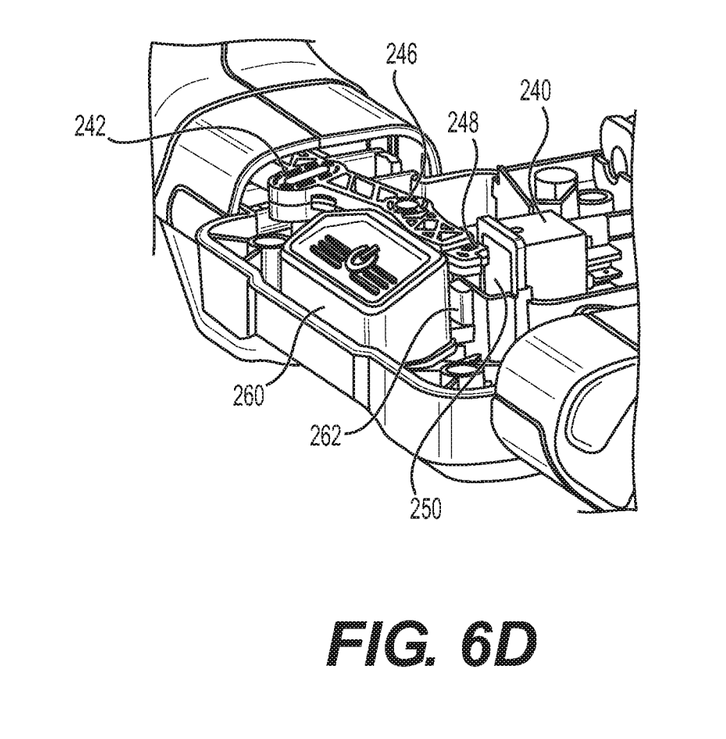

In comparing FIGS. 6A and 6B with each other, it may be seen that the first arm 242 may pivot about a pivot location 246 as the first trigger 144 is depressed. The pivot location 246 may include, for instance, a slot into which a pin from the second component 132 may be inserted. In addition, movement of the first arm 242 may cause a first end 248 of the first arm 242 to move toward the power switch 240. As shown in FIGS. 6C and 6D, the first end 248 may contact and depress an activation device 250 of the power switch 240. The second arm 244 may similarly be configured to the first arm 242 and depression of the second trigger 146 may result in an end of the second arm 244 pushing the activation device 250.

In examples, depression of the activation device 250 may cause electrical energy to be delivered through an electrical connection (not shown) to a motor in the base housing 102. For instance, depression of the first trigger 144 and/or the second trigger 146 may cause a motor to be activated and cause a work implement, such as a cutting blade to be rotated. In addition, or in other examples, depression of the first trigger 144 and/or the second trigger 146 may cause at least one of the wheels 106 to be driven. In any regard, an operator may control an operation and/or multiple operations of the machine 100 by pressing or releasing the first trigger 144 and/or the second trigger 146. Although not shown, a wire connected to the power switch 240 may extend through a tube 148 that is provided externally to the handle segment 128 such that the wire may be connected to the motor.

According to examples, the first trigger 144 and the second trigger 146 may normally be maintained in the positions depicted in FIGS. 6A and 6C, for instance, via springs and/or other mechanisms. In addition, or in other examples, a lock out member 260 may be provided to prevent unintended depression of the activation device 250. That is, a tab 262 may be attached to the lock out member 260 in which the tab 262 may block the first end 248 of the first arm 242 and the end of the second arm 244 when the lock out member 260 is in a normal position. The lock out member 260 may be maintained in the normal position via a spring (not shown). In order to depress the activation device 250, the lock out member 260 may be depressed, which may move the tab 262 out of the way of the path of travel of the ends of the first arm 242 and the second arm 244 as shown in FIG. 6D. As such, for instance, the lock out member 260 may prevent unintentional depression of the first trigger 144 or the second trigger 146, which may prevent unintentional movement of the machine 100.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A machine comprising:
   a base housing; and
   a handle assembly mounted to the base housing and extending at an angle from the base housing along a handle plane, the handle assembly having:
   a mating component having a plurality of slots arranged at multiple angular positions along a slot plane, the slot plane being parallel to the handle plane, and
   a handle segment rotatably mounted to the mating component, the handle segment housing a locking member, wherein the handle segment is pivotable along the slot plane relative to the base housing and wherein the locking member is removably insertable into a first slot of the plurality of slots when the handle segment is in a first angular position and is removably inserted into a second slot of the plurality of slots when the handle segment is in a second angular position; and
   a locking member attachment device attached to the locking member; and
   a locking member actuation device, wherein actuation of the locking member actuation device causes the locking member to be removed from a slot of the plurality of slots; and
   wherein the handle segment further comprises a handle and wherein the locking member actuation device is on the first handle; and
   wherein the handle segment further comprises a second handle and a second locking member actuation device, wherein the second locking member actuation device is connected to the locking member attachment device, and wherein actuation of the second locking member actuation device also withdraws the locking member from a slot of the plurality of slots in which the locking member is inserted.

2. The machine of claim 1, further comprising a first handle and a second handle, the first handle and the second handle extending substantially perpendicular to the handle plane, and wherein the locking member actuation device is positioned on at least one of the first handle or the second handle.

3. The machine of claim 1, farther comprising a spring to bias the locking member toward the mating component, and wherein actuation of the locking member actuation device applies a force that is counter to a force that the spring applies onto the locking member and removes the locking member from the slot.

4. The machine of claim 1, wherein the base housing houses a motor, wherein the handle assembly further comprises a first trigger and a second trigger respectively provided on the first handle and the second handle, and wherein actuation of either or both of the first trigger and the second trigger controls operation of the motor.

5. The machine of claim 4, wherein the handle assembly further comprises a lock out member to variably lock out activation of the motor.

6. A lawn mower comprising:
a mower deck;
a plurality of wheels rotatably mounted to the mower deck;
a handle assembly mounted to the mower deck and extending at an angle from the mower deck along a handle plane, the handle assembly having:
a mating component having a plurality of slots arranged at multiple angular positions along a slot plane, the slot plane being parallel to the handle plane; and
a handle segment rotatably mounted to the mating component, the handle segment housing a locking member, wherein the handle segment is pivotable along the slot plane relative to the mower deck and wherein the locking member is removably insertable into a first slot of the plurality of slots when the handle segment is in a first angular position and is removably inserted into a second slot of the plurality of slots when the handle segment is in a second angular position;
a first handle;
a second handle;
a locking member attachment device attached to the locking member;
a first locking member actuation device provided in the first handle, the first locking member actuation device being connected to the locking member; and
a second locking member actuation device provided in the second handle, the second locking member actuation device being connected to the locking member; and
wherein actuation of at least one of the first locking member actuation device or the second locking member actuation device causes the locking member attachment device and the locking member to be pulled away from the mating component.

7. The lawn mower of claim 6, wherein the first locking member actuation device is provided at a distal end of the first handle and wherein the second locking member actuation device is provided at a distal end of the second handle.

8. The lawn mower of claim 6, further comprising:
a motor to drive a work implement;
an electrical switch wired to the motor, the electrical switch including an activation device that when pressed causes the motor to be activated;
a first trigger provided on the first handle;
a first arm connected to the first trigger;
a second trigger provided on the second handle;
a second arm connected to the second trigger; and
a lock out member to selectively prevent the first arm and the second arm from contacting the activation device of the electrical switch.

* * * * *